United States Patent [19]

Mikic et al.

[11] Patent Number: 5,408,905

[45] Date of Patent: Apr. 25, 1995

[54] TILTABLE BALL-TYPE DRIVER

[75] Inventors: Frank Mikic, Kenosha; Christopher D. Thompson, Milwaukee, both of Wis.

[73] Assignee: Snap-on Incorporated, Kenosha, Wis.

[21] Appl. No.: 173,212

[22] Filed: Dec. 27, 1993

[51] Int. Cl.⁶ ............................................. B25B 23/00
[52] U.S. Cl. ........................................ 81/460; 81/436
[58] Field of Search ........................ 81/460, 461, 436

[56] References Cited

U.S. PATENT DOCUMENTS

| | | |
|---|---|---|
| 1,924,089 | 8/1933 | Croessant . |
| 2,750,974 | 6/1956 | Hart . |
| 3,213,719 | 10/1965 | Kloack . |
| 3,282,145 | 11/1966 | Prescott . |
| 3,295,572 | 1/1967 | Wing . |
| 3,872,904 | 3/1975 | Barlow ............................ 81/460 |
| 4,246,811 | 1/1981 | Bondhus et al. . |
| 4,338,835 | 7/1982 | Simons . |
| 4,824,418 | 4/1989 | Taubert . |
| 5,019,080 | 5/1991 | Hemer . |
| 5,251,521 | 10/1993 | Burda et al. . |
| 5,291,811 | 3/1994 | Goss ................................ 81/460 |

FOREIGN PATENT DOCUMENTS 548615  10/1942  United Kingdom ................. 81/436

*Primary Examiner*—D. S. Meislin
*Attorney, Agent, or Firm*—Emrich & Dithmar

[57] ABSTRACT

A driver is designed for coaxial and non-coaxial driving of a fastener with a lobed drive recess. The driver has a part spherical drive head connected by a neck to the drive end of a shank coaxially therewith, the outer surface of the head defining circumferentially alternating lobes and valleys extending longitudinally in planes containing the driver axis. The head is shaped such that its longitudinal cross section in one of the planes through a valley defines a central part-spherical portion and frustoconical end portions substantially tangent to the central portion respectively at its opposite ends. The head is further shaped so that, in its transverse cross section, each of the lobes has a leading flank and a trailing flank shaped and dimensioned that the flanks do not define undercuts which would make molding of the driver difficult.

19 Claims, 2 Drawing Sheets

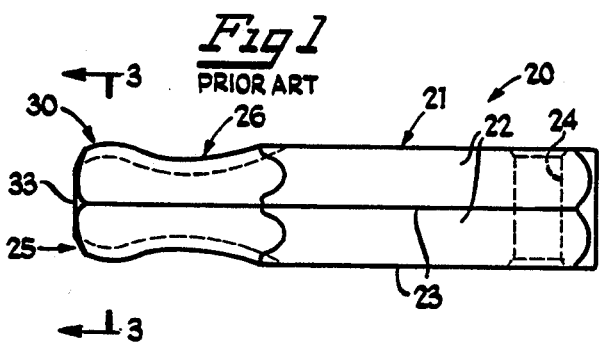
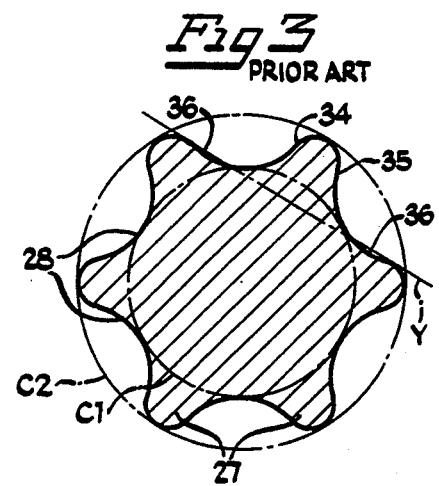
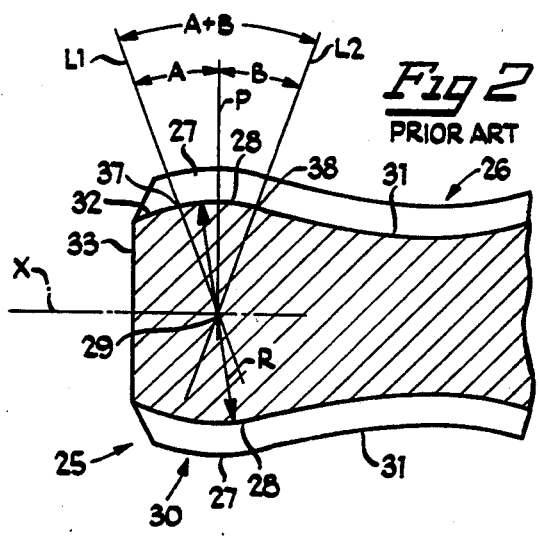
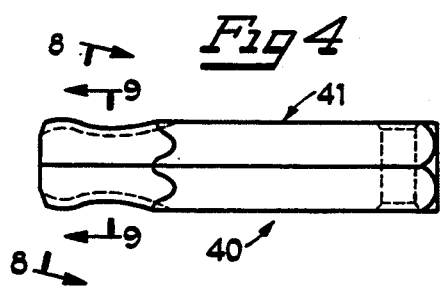
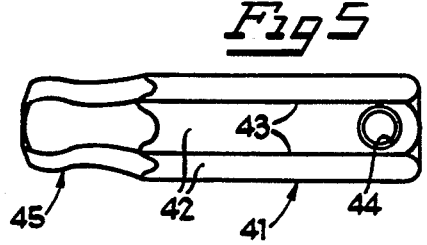
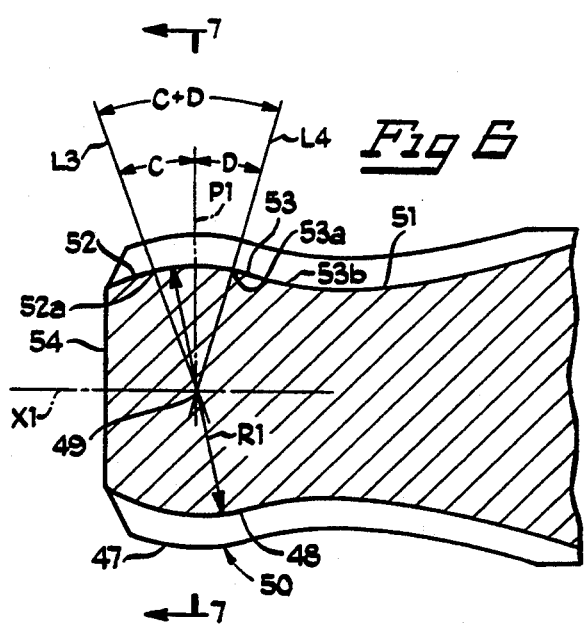
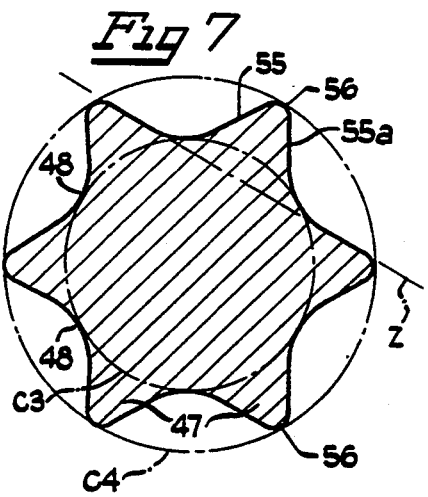

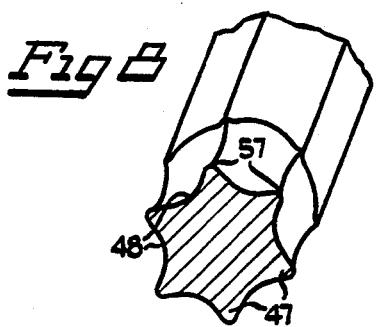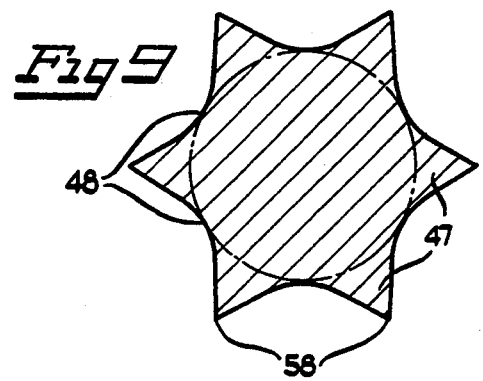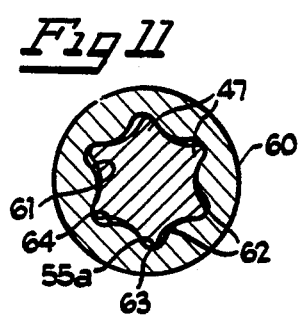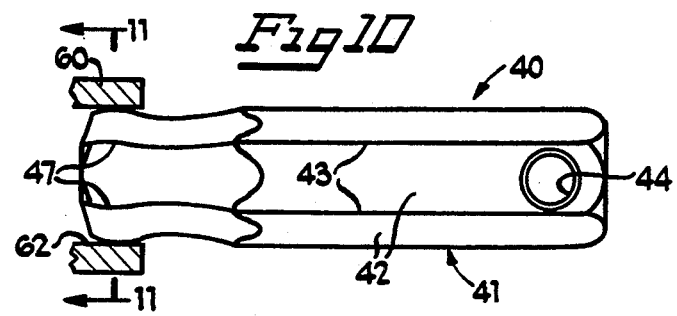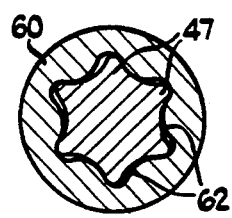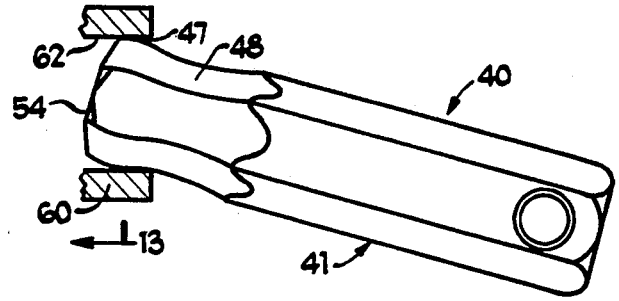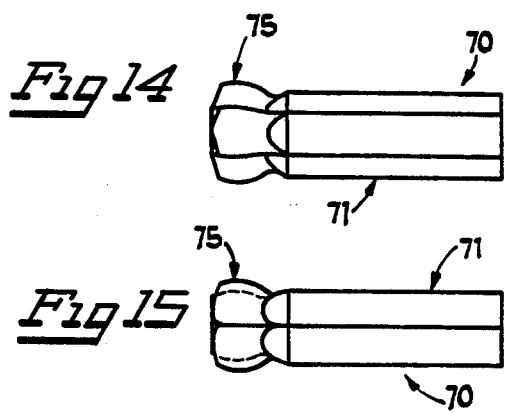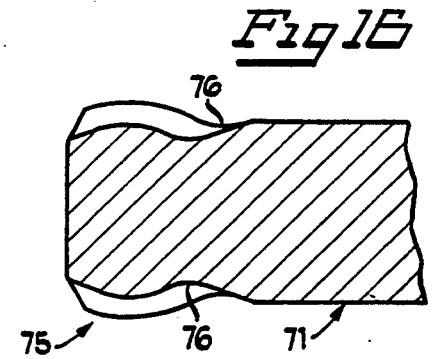

TILTABLE BALL-TYPE DRIVER

BACKGROUND OF THE INVENTION

1. Field of the Invention

The present invention relates to tools that are used to turn fasteners having lobed drive recesses or sockets. In particular, the invention relates to tools having a generally rounded drive head so as to be tiltable in the fastener drive recess to turn the fastener in a non-coaxial relationship.

2. Description of the Prior Art

The prior art contains a number of tools that have rounded or circular drive heads used to turn fasteners that have polygonal drive sockets or recesses. The purpose of the rounded head is to provide the capability of turning the fastener when the drive tool is disposed in an angular relationship with respect to the fastener's axis. This capability is significant where the fastener is located in a hard to reach place. One such driver is disclosed in U.S. Pat. No. 4,246,811 and is designed for turning a fastener with a polygonal drive recess. The driver has a rounded head which, in longitudinal cross section, is elliptical, resulting in a shape which is rather difficult to fabricate.

Another such driver is disclosed in U.S. Pat. No. 4,824,418, which discloses an articulated joint between two shafts, the one shaft having a lobed recess and the other having an enlarged rounded drive head. Again, however, the drive head in longitudinal cross section defines two non-concentric hemispheres.

One standard type of lobed-recess fastener is that sold by CamCar/Textron under the trademark "TORX" for which there are mateable lobed drivers. Heretofore, however, there have not been provided any effective ball-type TORX drivers to provide non-coaxial driving of a TORX fastener.

SUMMARY OF THE INVENTION

It is a general object of the invention to provide an improved male driver of the tiltable type which avoids the disadvantages of prior drivers while affording additional structural and operating advantages.

An important feature of the invention is the provision of a driver which will afford non-coaxial driving of a TORX fastener.

In connection with the foregoing feature, another feature of the invention is the provision of a driver of the type set forth which has a generally part-spherical drive head which can have a maximum transverse thickness greater than that of the associated driver shaft.

In connection with the foregoing features, another feature of the invention is the provision of a driver of the type set forth, which is of relatively simple and economical construction and which can be fabricated by a number of different techniques.

Still another feature of the invention is the provision of a driver of the type set forth which is provided with non-undercut lobes so as to facilitate molding or forming thereof.

These and other features of the invention are attained by providing a driver comprising: a shaft having an axis and a drive end, a ball-type drive head, and a neck connecting said head to said drive end of said shaft substantially coaxially therewith, said head having an outer surface defining circumferentially alternating depressions and elevations extending longitudinally in planes containing said axis, said head being shaped such that its longitudinal cross section in one of said planes through a depression defines a central part-spherical portion having a distal end and a neck end and frusto-conical end portions substantially tangent to said central portion respectively at the distal and neck ends thereof.

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

BRIEF DESCRIPTION OF THE DRAWINGS

For the purpose of facilitating an understanding of the invention, there is illustrated in the accompanying drawings a preferred embodiment thereof, from an inspection of which, when considered in connection with the following description, the invention, its construction and operation, and many of its advantages should be readily understood and appreciated.

FIG. 1 is a side elevational view of a prior art driver bit;

FIG. 2 is an enlarged, fragmentary view in vertical section through the head and neck of the bit of FIG. 1;

FIG. 3 is a view in vertical section taken along the line 3—3 in FIG. 2;

FIG. 4 is a view similar to FIG. 1, illustrating a bit in accordance with an embodiment of the present invention;

FIG. 5 is a view similar to FIG. 4 with the bit rotated 90° about its axis;

FIG. 6 is an enlarged, fragmentary view in vertical section through the head and neck of the bit of FIG. 4;

FIG. 7 is a view in vertical section taken along the line 7—7 in FIG. 6;

FIG. 8 is an enlarged sectional view taken along the line 8—8 in FIG. 4;

FIG. 9 is an enlarged sectional view taken along the line 9—9 in FIG. 4;

FIG. 10 is a view similar to FIG. 5, illustrating the bit engaged coaxially in an associated fastener head socket;

FIG. 11 is a sectional view taken along the line 11—11 in FIG. 10;

FIG. 12 is a view similar to FIG. 10, illustrating the bit engaged non-coaxially in the socket;

FIG. 13 is a sectional view taken along the line 13—13 in FIG. 12;

FIG. 14 is a view similar to FIG. 5 of a bit in accordance with another embodiment of the present invention;

FIG. 15 is a view of the bit of FIG. 14 rotated 90° about its axis; and

FIG. 16 is an enlarged, fragmentary view in vertical section of the head and neck portion of the bit of FIG. 11.

DESCRIPTION OF THE PREFERRED EMBODIMENTS

Referring to FIGS. 1–3, there is illustrated a prior art drive bit, generally designated by the numeral 20, which has a shank 21 hexagonal in transverse cross section and defining six hex faces 22 intersecting at corners 23. A bore 24 is formed radially through the shank 21 adjacent to one end thereof. Unitary with the shank 21 at the other end thereof is a ball-type head 25, joined to the shank 21 by a reduced neck 26. The bit 20 has six equiangularly spaced-apart elevations or lobes 27 extending longitudinally of the head 25 and the neck 26, and spaced apart by depressions or valleys 28, such that the crests of the lobes 27 are, respectively, aligned with the corners 23 of the hexagonal shank 21.

The head 25 has a part-spherical portion 30 having a center 29 disposed along the longitudinal axis X of the bit 20. The part-spherical portion 30 is disposed longitudinally centrally of the head 25 and its angular extent is defined, with respect to a diametral plane P perpendicular to the bit axis X, by two co-planar radial lines L1 and L2 extending from the center 29 to the same side of the axis X, the line L1 being inclined forwardly of the plane P and at an angle A with respect thereto and the line L2 being inclined rearwardly of the plane P at an angle B with respect thereto. Thus, the angle between the radial lines L1 and L2 is A+B, which defines the angular extent of the part-spherical portion 30, and the forward and rearward limits of that portion 30 are defined by rotating the radial lines L1 and L2 about the axis X.

In transverse cross section, the neck 26 is arcuately concave, defining an arcuate portion 31 which meets the part-spherical portion 30 tangent thereto at a boundary 38. The head 25 also includes a generally frustoconical portion 32 forwardly of the part-spherical portion 30 and tangent thereto at a boundary 37. An end surface 33 is formed at the distal end of the head 25.

As can best be seen in FIG. 2, each of the lobes 27 has a transverse cross section at the diametral plane P which is relatively blunt, having a rounded crest or apex and leading and trailing flanks 34 and 35. Thus, it will be appreciated that the trailing flank 35 of one lobe 27 cooperates with the leading flank 34 of an adjacent lobe 27 to define the valley 28 therebetween. The valleys 28 are all tangent to a common imaginary circle C1 having the center 29, while the crests of the lobes 27 are all tangent to a concentric imaginary circle C2. The curvature of the lobes 27 is such at the diametral plane P that each of two lobes 27 once removed from each other (i.e., two lobes separated by a single intervening lobe) would have undercut portions 36 thereof disposed inwardly toward the axis X relative to an imaginary plane Y parallel to the axis X and tangent to the two lobes, as is illustrated in FIG. 2. This undercut configuration makes the head 25 very difficult to mold or form, effectively limiting the prior art bit 20 to formation by machining, thereby limiting the maximum diameter of the head 25 to the maximum thickness of the shank 21.

Referring to FIGS. 4–9, there is illustrated a drive bit 40, constructed in accordance with and embodying the features of the present invention. The bit 40 is of unitary, one-piece construction and includes an elongated shank 41, hexagonal in transverse cross section, and defining six hex faces 42 intersecting at corners 43. A bore 44 is formed radially through the shank 41 adjacent to one end thereof. Formed at the other end of the bit 40 is a ball-type head 45, which is joined to the shank 41 by a reduced neck 46. The bit 40 has six equiangularly spaced-apart elevations or lobes 47 extending longitudinally of the head 45 and the neck 46 and spaced-apart by depressions or valleys 48, such that the crests of the lobes 47 are, respectively, aligned with the corners 43 of the hexagonal shank 41.

The head 45 is similar to the head 25 of the prior art bit 20, having a part-spherical portion 50 with a center 49 disposed on the longitudinal axis X1 of the bit 40. The part-spherical portion 50 is disposed longitudinally centrally of the head 45 and its angular extent is defined, with respect to a diametral plane P1 perpendicular to the bit axis X1, by two co-planar radial lines L3 and L4 extending from the center 49 to the same side of the axis X1, the line L3 being inclined forwardly of the plane P1 at an angle C with respect thereto and the line L4 being inclined rearwardly of the plane P1 at an angle D with respect thereto. Thus, the angle between the radial lines L3 and L4 is C+D, which defines the angular extent of the part-spherical portion 50, and the forward and rearward limits of that portion are defined by rotating the radial lines L3 and L4 about the axis X1.

In transverse cross section, the neck 46 is arcuately concave, defining an arcuate portion 51. The head 45 also includes a generally frustoconical portion 52 forwardly of the part-spherical portion 50 and tangent thereto at a boundary 52a, and a generally frustoconical portion 53 rearwardly of the part-spherical portion 50 and tangent thereto at a boundary 53a. The arcuate portion 51 of the neck 46 meets the frustoconical portion 53 tangent thereto at a boundary 53b. An end surface 54 is formed at the distal end of the head 45.

As can best be seen in FIG. 7, each of the lobes 47 has a transverse cross section at the diametral plane P1 which is somewhat sharper than that of the lobes 27 of the bit 20. Each lobe 47 has a lobe crest or apex 56 and leading and trailing flanks 55 and 55a, such that the training flank 55a of one lobe 47 cooperates with the leading flank 55 of an adjacent lobe 47 to define the valley 48 therebetween.

The valleys 48 are all tangent to a common imaginary circle C3 having the center 49, while the crests 56 of the lobes 47 are all tangent to a concentric imaginary circle C4 (see FIG. 7). It is a significant aspect of the invention that the curvature of lobes 47 is such at the diametral plane P1 that, if an imaginary plane Z parallel to the axis X1 is drawn tangent to each of two lobes 47 once removed from each other (i.e., two lobes separated by a single intervening lobe), no portion of either lobe is disposed inwardly toward the axis X1 relative to the plane Z, as can best be seen in FIG. 7. Thus, while the bit 40, as illustrated, is produced by machining of hexagonal stock, it will be appreciated that it could also be produced by casting or forming. When the bit 40 is formed by machining, it will be appreciated that the maximum diameter of the head 25 cannot exceed the maximum thickness of the hexagonal shank 41. If this maximum thickness is relatively small, e.g., in the range of about ¼ inch, the radius of the arcuate portion 51 of the neck 46 will be relatively large, since it is limited by the size of machining wheel which can practicably be used. As can be seen from a comparison of FIGS. 7, 8 and 9, the cross section of the lobes 47 and, therefore, the valleys 48, varies longitudinally. More specifically, the crest or apex 56 of each lobe 47 is bluntest at the diametral plane P1, is somewhat sharper at portions of the head 25 displaced longitudinally from the diametral plane P1 (see 57 in FIG. 8), and is sharpest at the neck 46 (see 58 in FIG. 9).

It is a significant aspect of the invention that the frustoconical portions 52 and 53 both fore and aft of the part-spherical portion 50 of the head 45 facilitate good driving contact with an associated fastener when the bit 40 is tilted relative to the fastener. In this regard, referring to FIGS. 10–13, the bit 40 is illustrated in cooperation with an associated fastener head 60 having a socket 61 formed therein which is substantially of the TORX configuration, having six arcuate lobes 62, each having leading and trailing flanks 63 and 64. When the bit 40 is engaged with the fastener 60 coaxially therewith, as is illustrated in FIGS. 10 and 11, the lobes 47 of the head 45 engage in the socket 61 of the fastener head 60 in the manner illustrated. More specifically, when the fastener head 60 is to be rotated in the clockwise direction, as illustrated in FIG. 11, the flanks 55a of the bit lobes 47 respectively engage the flanks 63 of the socket lobes 62. When the bit 40 is tilted to a non-coaxial orientation relative to the fastener head 60, as is illustrated in FIGS. 12 and 13, the bit 40 still makes good engaging contact in the fastener socket 61, this contact occurring at the frustoconical portions 52 and 53 of the head 45 when the bit is tilted its maximum extent. Thus, the fact that the head 45 has frustoconical portions 52 and 53 both fore and aft of the part-spherical portion 50 tangent thereto ensures good driving contact around substantially the entire perimeter of the head 45 when the bit 40 is tilted.

Referring now to FIGS. 14–16, there is illustrated a drive bit 70 in accordance with another embodiment of the present invention. The bit 70 is similar to the bit 40 described above, being of unitary, one-piece construction and including an elongated hexagonal shank 71 and a ball-type head 75 joined together by a reduced neck 76. The head 75 is substantially the same as the head 45 described above. The fundamental difference between the bit 40 and the bit 70 is that the bit 70 can be produced by investment casting or forming. Thus, the head 75 can have a maximum diameter greater than the maximum thickness of the shank 71 and the neck 76 can be substantially shorter than in the case of the machined bit 40, since the radius of the arcuate neck surface is not limited by the minimum size of available machining tools.

In the prior art bit 20, the angles A and B are typically equal, both being about 20° in the case of a 5/16-inch bit. In the bits 40 and 70, the angles C and D may each be 20° or any other suitable angle.

From the foregoing, it can be seen that there has been provided an improved drive bit with a ball-type head of simple and economical construction, being formable by either machining or investment casting, and which affords effective engagement with an associated fastener through a wide range of articulation.

We claim:

1. A driver comprising: a shaft having an axis and a drive end, a ball-type drive head, and a neck connecting said head to said drive end of said shaft substantially coaxially therewith, said head having an outer surface defining circumferentially alternating lobes and valleys extending longitudinally in planes containing said axis, said head being shaped such that its longitudinal cross section in one of said planes through a valley defines a central part-spherical portion having a distal end and a neck end and frustoconical end portions substantially tangent to said central portion respectively at the distal and neck ends thereof.

2. The driver of claim 1, wherein said part-spherical portion extends on both sides of a radial plane perpendicular to said axis.

3. The driver of claim 2, wherein said part-spherical portion extends substantially equidistantly on each side of said radial plane.

4. The driver of claim 1, wherein each of said lobes is generally triangular in transverse cross section and has an apex which is more rounded adjacent to said central portion than it is to adjacent to said end portions.

5. The driver of claim 1, wherein said shaft is polygonal in transverse cross section.

6. The driver of claim 1, wherein said head has a maximum transverse thickness which is greater than that of said shaft.

7. The driver of claim 1, wherein said head has a maximum transverse thickness which is no greater than that of said shaft.

8. A driver comprising: a shaft having an axis and a drive end, a ball-type drive head having a center and connected to said drive end of said shaft substantially coaxially therewith, said head being shaped such that its transverse cross section through its center perpendicular to the axis defines a plurality of equiangularly spaced-apart lobes projecting radially outwardly relative to said axis, each of said lobes having a leading flank and a trailing flank shaped and dimensioned such that no part of a first leading flank on a first lobe or of a second trailing flank on a second lobe once removed from said first lobe extends to the axis side of a plane parallel to said axis and tangent to said first and second flanks.

9. The driver of claim 8, wherein said head has an even number of said lobes.

10. The driver of claim 9, wherein the number of said lobes is six.

11. The driver of claim 8, wherein each of said flanks extends from a peak of the associated lobe to a valley disposed between the associated lobe and an adjacent lobe, the peaks of said lobes being tangent to a first common imaginary circle and the valleys between said lobes being tangent to a second common imaginary circle concentric with said first circle.

12. The driver of claim 8, wherein said head has a maximum transverse thickness which is greater than that of said shaft.

13. A driver comprising: a shaft having an axis and a drive end, a ball-type drive head having a center, and a neck connecting said head to said drive end of said shaft substantially coaxially therewith, said head having an outer surface defining circumferentially alternating lobes and valleys extending longitudinally in planes containing said axis, said head being shaped such that its longitudinal cross section in one of said planes through a valley defines a central part-spherical portion having a distal end and a neck end and frustoconical end portions substantially tangent to said central portion respectively at the distal and neck ends thereof, said head being shaped such that at its transverse cross section through its center perpendicular to the axis, each of said lobes has a leading flank and a trailing flank shaped and dimensioned such that no part of a first leading flank on a first lobe or of a second trailing flank on a second lobe once removed from said first lobe extends to the axis side of a plane parallel to said axis and tangent to said first and second flanks.

14. The driver of claim 13, wherein said part-spherical portion extends on both sides of a radial plane perpendicular to said axis.

15. The driver of claim 13, wherein each of said lobes is generally triangular in transverse cross section and has an apex which is more rounded adjacent to said central portion than it is adjacent to said end portions.

16. The driver of claim 13, wherein said head has an even number of said lobes.

17. The driver of claim 13, wherein said head has a maximum transverse thickness which is greater than that of said shaft.

18. The driver of claim 13, wherein said head has a maximum transverse thickness which is no greater than that of said shaft.

19. The driver of claim 13, wherein said shaft and said head and said neck are unitary with one another in a one-piece construction.

* * * * *

Disclaimer 5,408,905 —Frank Mikic, Kenosha; Christopher D. Thompson, Milwaukee, both of Wis. TILTABLE BALL-TYPE DRIVER. Patent dated April 25, 1995. Disclaimer filed July 3, 1995, by the assignee, Snap-on Incorporated.

Hereby enters this disclaimer to claims 8-12 of said patent.
*(Official Gazette* September 5, 1995.)